US009011017B2

(12) United States Patent
Schroder

(10) Patent No.: US 9,011,017 B2
(45) Date of Patent: Apr. 21, 2015

(54) RADIAL ROLLER BEARING

(75) Inventor: Rainer Schroder, Egenhausen (DE)

(73) Assignee: Schaeffler Technologies, AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/113,683

(22) PCT Filed: Apr. 12, 2012

(86) PCT No.: PCT/EP2012/056605
§ 371 (c)(1),
(2), (4) Date: Oct. 24, 2013

(87) PCT Pub. No.: WO2012/152519
PCT Pub. Date: Nov. 15, 2012

(65) Prior Publication Data
US 2014/0169717 A1    Jun. 19, 2014

(30) Foreign Application Priority Data
May 12, 2011  (DE) .......................... 10 2011 075 730

(51) Int. Cl.
*F16C 23/08*   (2006.01)
*F16C 33/60*   (2006.01)
*F16C 33/66*   (2006.01)
*F16C 33/58*   (2006.01)

(52) U.S. Cl.
CPC ............. *F16C 33/605* (2013.01); *F16C 23/086* (2013.01); *F16C 33/585* (2013.01); *F16C 33/6659* (2013.01)

(58) Field of Classification Search
CPC ...... F16C 23/08; F16C 23/082; F16C 23/084; F16C 23/086; F16C 23/088; F16C 33/60

USPC .................................. 384/558, 560, 568, 570
See application file for complete search history.

(56) References Cited

U.S. PATENT DOCUMENTS 3,166,363 A * 1/1965 Kay .............................. 384/570
4,733,977 A   3/1988 Eisenmann et al.
5,186,547 A   2/1993 Muhl et al.

FOREIGN PATENT DOCUMENTS

DE    1951759    5/1970
DE    1958363    6/1971

(Continued)

*Primary Examiner* — Phillip A Johnson
(74) *Attorney, Agent, or Firm* — Volpe and Koenig, P.C.

(57) ABSTRACT

A radial rolling bearing (10) with rolling bodies (24) which are received in at least one cage (26, 28) and which are arranged between an inner ring (20) and an outer ring (22). The radial rolling bearing (12) is radially separable, and the radially multipart inner ring (20) can be fixed on a shaft (16) using two clamping rings (36, 38) which are attached to the axial ends of said inner ring. The inner ring (20) is designed without rims on the axially outer sides, and the clamping rings (36, 38) take on the function of inner ring rims, the rolling bodies (24) running against inner run-on surfaces (50) of the clamping rings (36, 38) in the axial direction. On the basis of the at least partial positioning of the clamping rings (36, 38) axially below the cages (26, 28) or the outer ring (22), the clamping rings (36, 38) take on two additional functions in addition to the actual clamping ring main function of fixing the inner ring (20) on the shaft (16). Firstly, the clamping rings (36, 38) form a cage guide in the radial direction, and secondly, the clamping rings assist the axial guiding of the rolling bodies (24) by the inclined inner run-on surfaces (50). The radial rolling bearing additionally has a reduced axial installation dimension due to the special arrangement of the clamping rings (36, 38) in the radial rolling bearing.

9 Claims, 1 Drawing Sheet

(56) References Cited

FOREIGN PATENT DOCUMENTS

| | | |
|---|---|---|
| DE | 7310263 | 7/1973 |
| DE | 3503344 | 8/1986 |
| DE | 4114842 | 11/1992 |
| JP | 2007218394 A * | 8/2007 |

* cited by examiner

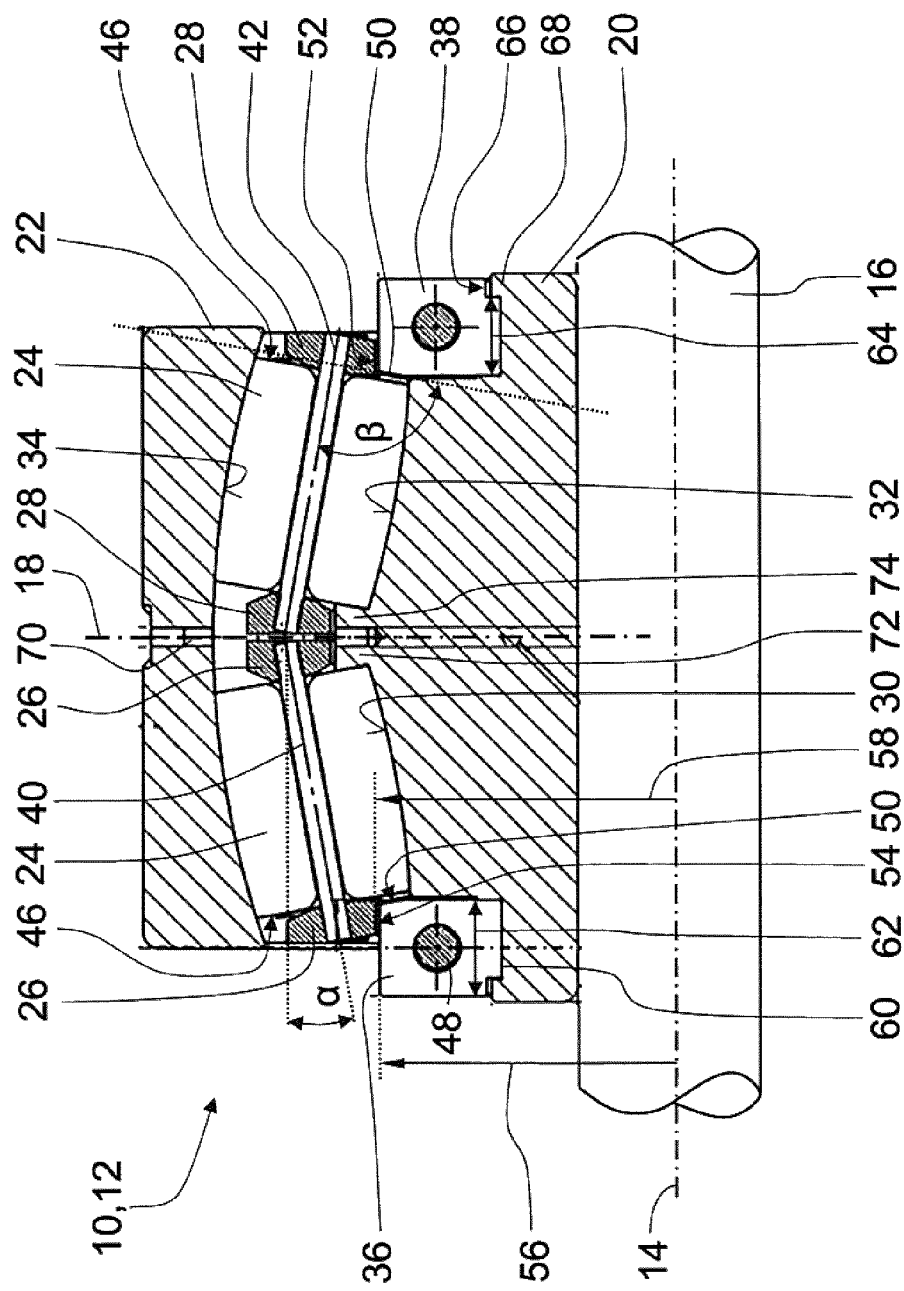

RADIAL ROLLER BEARING

FIELD OF THE INVENTION

The invention relates to a radial rolling bearing with rolling elements, which are accommodated in at least one cage and which are arranged between an inner ring and an outer ring, wherein the radial rolling bearing is designed to be radially divisible, and in which the radially multipart inner ring can be fixed on a shaft with the aid of two clamping rings engaging at the axial ends on said inner ring.

BACKGROUND

Radial rolling bearings that can be divided are widely used in industry to provide low-friction and low-wear support for machine parts. In divisible radial rolling bearings, clamping rings are placed around inner ring segments of the bearing, e.g. inner ring segments in the form of half shells, in order to fix them on a shaft. All the other components of the radial rolling bearing, in particular the outer ring and the rolling element cage, are likewise embodied in such a way that they are radially divisible or segmented, thus enabling them to be mounted around a continuous shaft in a simple manner. As a result, an involved process of pulling the shaft out of machine parts arranged upstream or downstream in terms of drive engineering is advantageously eliminated. Divided radial rolling bearings of this kind are used in applications in which replacement of the bearings would otherwise lead to a high outlay on disassembly due to the removal of the adjoining machine parts. Moreover, faulty bearings can be replaced in a simple manner with divisible radial rolling bearings.

In the case of known radially divisible radial rolling bearings, the clamping rings are arranged on the left-hand and right-hand sides on retaining rims of the inner ring, thereby considerably increasing the axial overall length of said bearings in comparison with radial rolling bearings that are not divisible and, for example, making it more difficult, if not indeed impossible, to retrofit said bearings in old bearing locations or bearing housings, which generally have limited installation space.

Divisible self-aligning roller bearings which, in addition to the primary bearing function, allow compensation of angular misalignment of up to several degrees in relation to adjacent machine parts, e.g. engines, transmissions, clutches or the like, are furthermore also known. In addition to easy repair of an old bearing in the case of faults or maintenance, divisible self-aligning roller bearings therefore additionally allow compensation of machine parts which are not fully aligned.

DE 1 958 363 U has disclosed a self-aligning roller bearing with a divided inner ring, which can be clamped on a shaft by means of undivided tapered rings. One disadvantage of this known embodiment is the complexity of mounting the inner ring on the shaft, which is possible only by supplying oil under high pressure into a hole in one of the tapered rings. Moreover, an undivided standard bearing can only be replaced with a lot of effort by means of this technical solution since the undivided clamping rings cannot subsequently be pushed onto the bearing shaft, i.e. not without previously removing or pulling out the bearing shaft.

It is therefore the underlying object of the invention to propose a radially divided radial rolling bearing which has a reduced axial overall length in comparison with known embodiments.

SUMMARY

The invention is based on the realization that exchanging radial rolling bearings is often a very involved process because adjoining machine parts have to be removed beforehand in order to be able to remove the bearing. Radially divisible radial rolling bearings, in contrast, can be installed and removed more quickly since the adjoining machine parts do not have to be removed to change the bearings and, in particular, it is not necessary to pull out the shaft to be supported beforehand. Owing to the clamping rings required with divisible bearings, however, said bearings require a larger overall length in the axial direction than bearings which are not divisible. It is possible to shorten the axial overall length if the clamping rings located at the ends are arranged offset axially further toward the center of the bearing and assume the function of inner ring rims.

Accordingly, the invention starts from a radial rolling bearing with rolling elements, which are accommodated in at least one cage and which are arranged between an inner ring and an outer ring, wherein the radial rolling bearing is designed to be radially divisible, and in which the radially multipart inner ring can be fixed on a shaft with the aid of two clamping rings engaging at the axial ends on said inner ring. To achieve the stated object, provision is made for the inner ring to be designed without rims on the axially outer sides, and for the clamping rings to assume the function of inner ring rims, wherein the rolling elements run up against inner thrust surfaces of the clamping rings in the axial direction.

By means of this design, the radial rolling bearing is advantageously shortened at least by the axial width of the two inner ring rims formed in the prior art. Moreover, the production costs for a radial rolling bearing designed in accordance with the invention are significantly lower than in the previous design since reducing the axial overall length of the inner ring and the outer ring makes it possible to save on materials for these and, furthermore, the production step for the production of inner ring rims is avoided. As a result, a self-aligning radial roller bearing which is axially particularly short, for example, can be manufactured at very low cost.

By virtue of the fact that the clamping rings in the embodiment according to the invention of the divisible radial rolling bearing assume not only their actual basic function of securing the position of the inner ring on a shaft but also, at the same time, the task of providing axial support for the rolling elements, there is a significant reduction in axial overall length and increased functionality as compared with known radial rolling bearings with two or multiple radial divisions. The radial rolling bearing is thus universally suitable for fitting from new and for retrofitting and/or conversion of machines.

According to a development of the invention, provision can be made, axially at the outside, for the at least one cage to be guided in the radial direction on at least one clamping ring outer surface. Axially on the inside, the at least one cage can be guided radially on a radially oriented surface of an inner ring rim.

According to another advantageous embodiment, provision is made for the inner thrust surfaces of the clamping rings to be aligned substantially parallel to the outer thrust surfaces of the respectively associated rolling elements, said outer thrust surfaces being situated axially at the ends. The angle of inclination $\beta$ of the thrust surface of the respective clamping ring relative to the longitudinal axis of the associated rolling element is therefore about 90°.

According to another development of the invention, provision is made for the outside diameter of the clamping rings to be less than or equal to the inside diameter of the cage at the axially outer inner circumferential surface thereof. By varying the outside diameter of the clamping rings, it is possible to precisely set the radial play of the cage.

Moreover, provision can be made for the longitudinal axes of the respective rolling elements accommodated in the at least one cage to slope at an angle α relative to a longitudinal axis of the shaft. Apart from the divisibility of the radial rolling bearing, this additionally provides the possibility of angular compensation of up to several degrees between a bearing shaft and the inner ring or the outer ring of the radial rolling bearing, thereby giving the functionality of a self-aligning roller bearing. Inter alia, this allows the use of the bearing with machine parts which are not fully aligned with one another. At the same time, higher axial loads can be absorbed.

According to another development of the radial rolling bearing, the clamping rings have a substantially rectangular cross-sectional geometry, and the width of the clamping rings is in each case dimensioned in such a way that at least one connecting element, e.g. a screw bolt, can be introduced into the clamping rings. As a result, it is possible, for example, for two semicircular clamping ring segments that together form a clamping ring to be clamped firmly and held together on the inner ring by means of the connecting elements in order to fix the inner ring on the shaft. Here, the approximately rectangular cross-sectional geometry simplifies the process of producing the clamping rings from a metal strip material of rectangular geometry.

According to another advantageous embodiment, provision is made for the clamping rings each to be accommodated in an encircling groove in the inner ring. After the assembly of the radial rolling bearing, firm seating of the clamping rings in the axial direction on the shaft is thereby obtained in the encircling groove, thereby ensuring that they are fixed in a manner secure against sliding and twisting on the shaft.

According to another development of the radial rolling bearing, provision is made for the clamping rings each to have an offset axially on the outside of the inner circumferential surface thereof, into which offsets respective encircling, radially outward-directed projections on the inner ring engage at least over a certain area. The projections on the inner ring which engage in the offsets, which are preferably approximately rectangular, allow a clamping ring width which is greater in the axial direction than the width of the annular groove in the inner ring.

Another embodiment of the radial rolling bearing envisages that the inner ring and/or the outer ring has/have at least one hole for supplying a lubricant. The hole is preferably formed to the outside of connecting zones of the segmented inner and outer rings.

BRIEF DESCRIPTION OF THE DRAWINGS

The invention is further explained below via an embodiment with reference to the attached drawing. In said drawing, the single FIGURE shows a schematic cross-sectional representation of a two-row self-aligning roller bearing.

DETAILED DESCRIPTION OF THE PREFERRED EMBODIMENTS

The FIGURE shows a schematic cross section through a radial rolling bearing embodied in accordance with the invention. By way of example, the radial rolling bearing 10 is embodied as a self-aligning roller bearing 12, which is constructed so as to be substantially symmetrical with respect to a shaft longitudinal axis 14 of a shaft 16 and with respect to a radial axis 18 extending perpendicularly thereto. Due to the symmetry of the self-aligning roller bearing 12, components which are a mirror image of each other are not provided with two different reference numerals throughout, for the sake of clarity in the drawing.

A plurality of approximately barrel-shaped rolling elements 24 is arranged between an inner ring 20 of radially divisible design and an outer ring 22 of radially divisible design. Here, the inner ring 20 and the outer ring 22 are each formed by at least two segments (not shown specifically) in the form of half shells, which are held together by means of clamping rings 36, 38 and connecting bolts 48 passed through the latter. Details of this will be given further below.

The rolling elements 24 are arranged in two rows and are each accommodated in a cage 26, 28. The rolling elements 24 roll on two concave races 30, 32 of the inner ring 20 and one convex race 34 of the outer ring 22. Here, the curvature of the rolling elements 24 corresponds to the curvature of the slightly concave races 30 to 34 mentioned.

The inner ring 20 of the self-aligning roller bearing 12 is secured on the shaft 16 with the aid of two clamping rings 36, 38. The two clamping rings 36, 38 each have approximately the geometrical configuration of a hollow cylinder of short length. The rolling elements 24 each have an axial hole, through which in each case a cage pin 40, 42 is passed, with the result that the rolling elements 24 are rotatably mounted on said cage pins 40, 42.

The cage pins 40, 42 are each oriented at an angle α in relation to the longitudinal axis 14 of the shaft. Due to the approximately barrel- or cask-shaped rolling elements 24 in combination with the concave and convex races 30, 32, 34, the outer ring 22 and the inner ring 20 can be pivoted relative to one another by up to 5° out of the position shown during the operation of the self-aligning roller bearing 12. There is an angle β of approximately 90° between the respective outer thrust surfaces 46 of the rolling elements 24, said surfaces being situated axially on the outside, and the longitudinal axis of the cage pins 40, 42.

Axially on the inside, the clamping rings each have an inner thrust surface 50 for the outer thrust surfaces 46, situated axially on the outside, of the respective rolling elements 24, wherein the inner thrust surfaces 50 are designed with a slope such that the outer thrust surfaces 46 of the respective rolling elements 24 and the respectively associated inner thrust surface 50 on the clamping ring 36, 38 are oriented so as to be plane-parallel to one another. By virtue of the outer thrust surfaces 46 of the rolling elements 24, which surfaces extend parallel to the obliquely set inner thrust surfaces 50 of the clamping rings 36, 38, said rolling elements are guided in the axial direction. The slope of the respective inner thrust surfaces 50 of the clamping rings 36, 38 in relation to the vertical axis 18 corresponds to about 5°. Angles in a range of between 5° and 30° are likewise possible. The slightly sloping inner thrust surfaces 50 are formed axially opposite on both clamping rings 36, 38 and, at the same time, are of mirror-symmetrical design with respect to the vertical axis 18.

Radial guidance of the cages 26, 28 is provided axially on the outside, likewise with the aid of the two clamping rings 36, 38. For this purpose, each clamping ring 36, 38 has a clamping ring outer surface 52 facing radially outward. The cages 26, 28 are each located on the clamping ring outer surfaces 52 by means of their axially outer inner circumferential surface 54 in such a way that they can move easily. In order to achieve a defined cage guidance play, the outside diameter 56 of the clamping rings is in each case less than or equal to the diameter 58 of the cage 26, 28 at the axially out of the inner circumferential surface 54 thereof. Axially on the inside, the inner ring 20 has a central inner ring rim 72, 74, on which the rolling elements 24 can be supported axially on the inside and the cages 28, 28 can be supported radially on the inside.

The clamping rings 36, 38 are each accommodated in an encircling groove 60 in the inner ring 20. The axial width 62 of the clamping rings 36, 38 is in each case greater than a width 64 of the groove 60. Axially at the ends, the clamping rings 36, 38 each have an encircling offset 66, into each of which an encircling, radially outward-facing projection 68 on the inner ring 20 engages, at least over a certain section. The offsets 66 in the clamping rings 36, 38 make it possible to configure the width 62 of the clamping rings 36, 38 to a large extent independently of the width 64 of the encircling groove 60. A radial hole 70, by which a lubricant can be introduced into the bearing, for example, is furthermore introduced into the outer ring 22.

By virtue of the fact that the two clamping rings 36, 38 are positioned at least partially below the two cages 26, 28, the clamping rings 36, 38 can, apart from their actual main function, namely that of fixing the inner ring 20 on the shaft 16, additionally guide the cages 26, 28 in the radial direction and furthermore provide thrust surfaces for the rolling elements 24 in the axial direction.

Moreover, this special positioning of the clamping rings 36, 38 reduces the axial overall length of the radial rolling bearing 10 or of the self-aligning roller bearing 12, thereby making it possible, in particular, for said bearing to be used as a universal replacement for older radial rolling bearings that were not yet divisible in the course of repair, conversion and retrofitting measures.

LIST OF REFERENCE SIGNS 10 radial rolling bearing
12 self-aligning roller bearing
14 longitudinal axis of the shaft
16 shaft
18 radial axis
20 inner ring
22 outer ring
24 rolling element
26 cage
28 cage
30 race on the inner ring
32 race on the inner ring
34 race on the outer ring
36 clamping ring
38 clamping ring
40 cage pin
42 cage pin
46 outer thrust surface on the rolling element
48 connecting bolt, connecting element
50 inner thrust surface on the clamping ring
52 clamping ring outer surface
54 axially outer inner circumferential surface of the cage
56 clamping ring outside diameter
58 diameter of the cage at the axially outer inner circumferential surface 54 thereof
60 groove in the inner ring
62 width of the clamping ring
64 width of the groove in the inner ring
66 offset on the clamping ring
68 projection on the inner ring
70 hole
72 central inner ring rim

The invention claimed is:

1. A radial rolling bearing comprising rolling elements accommodated in at least one cage, and the rolling elements are arranged between an inner ring and an outer ring, the radial rolling bearing is radially divisible with the inner ring comprising a radially multipart inner ring that is adapted for fixing on a shaft via two clamping rings engaging at axial ends on said inner ring, the inner ring is rimless on axially outer sides thereof, the clamping rings act as inner ring rims, and the rolling elements run up against inner thrust surfaces of the clamping rings in an axial direction wherein a radial inner facing surface of an axial outer portion of the at least one cage is located on a radial outermost circumferential surface of one of the clamping rings.

2. The radial rolling bearing as claimed in claim 1, wherein the inner thrust surfaces of the clamping rings are aligned substantially parallel to outer thrust surfaces of the rolling elements, said outer thrust surfaces being situated axially at ends of the rolling elements.

3. The radial rolling bearing as claimed in claim 1, wherein an outside diameter of the clamping rings is less than or equal to an inside diameter of the cage at an axially outer inner circumferential surface thereof.

4. The radial rolling bearing as claimed in claim 1, wherein a longitudinal axis of the rolling elements slopes at an angle α relative to a longitudinal axis of the shaft.

5. The radial rolling bearing as claimed in claim 1, wherein the clamping rings have a substantially rectangular cross-sectional geometry, and an axial width of the clamping rings is dimensioned to accommodate at least one connecting element that is introduced into the clamping rings.

6. The radial rolling bearing as claimed in claim 1, wherein the clamping rings are each accommodated in an associated encircling groove in the inner ring.

7. The radial rolling bearing as claimed in claim 1, wherein the clamping rings each have an offset axially on an outside of an inner circumferential surface thereof, into which respective encircling, radially outer-directed projections on the inner ring engage at least over a section of the offset.

8. The radial rolling bearing as claimed in claim 1, wherein at least one of the inner ring or the outer ring has at least one hole for supplying a lubricant.

9. The radial rolling bearing as claimed in claim 1, wherein said bearing is a self-aligning roller bearing.

* * * * *